US006999185B1

(12) United States Patent
Salgado

(10) Patent No.: US 6,999,185 B1
(45) Date of Patent: Feb. 14, 2006

(54) SYSTEM AND METHOD FOR MERGING TOGETHER JOBS IN A MULTI-PLATFORM PRINTING SYSTEM WHEN ONE OF THE PLATFORMS IS IN A DEGRADED MODE

(75) Inventor: David L. Salgado, Victor, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/444,163

(22) Filed: Nov. 22, 1999

(51) Int. Cl.
*H04N 1/40* (2006.01)
(52) U.S. Cl. ....................... 358/1.12; 358/468
(58) Field of Classification Search ...... 358/1.12–1.16, 358/1.4, 1.13, 1.15, 1.437, 444, 404, 468, 358/1.9
See application file for complete search history.

(56) References Cited

U.S. PATENT DOCUMENTS 4,947,345 A * 8/1990 Paradise et al. ............ 358/442
5,923,826 A   7/1999 Grzenda et al. ............ 395/114
5,949,975 A * 9/1999 Batty et al. ................. 709/213

OTHER PUBLICATIONS

"HP LaserJet 4 Printer Software Application Notes (Printing With Your Software", pp. 2-6-2-9, Hewlett-Packard Company, ©1992.*

* cited by examiner

*Primary Examiner*—Thomas D. Lee
*Assistant Examiner*—Stephen Brinich
(74) *Attorney, Agent, or Firm*—Fay, Sharpe, Fagan, Minnich & McKee, LLP

(57) ABSTRACT

A multi-functional printing system having a plurality of platforms, where each of the platforms is adapted to perform a selected service. The printing system includes a first platform having a first queue, such as a queue utility for storing a job associated with the first platform, and a second queue, such as a shadow queue, for storing a job associated with a different platform. The system also employs a second platform disposed in communication with the first platform. The second platform has a first queue for storing a job associated with the second platform and a second queue for storing a job associated with a different platform.

24 Claims, 6 Drawing Sheets

SYSTEM AND METHOD FOR MERGING TOGETHER JOBS IN A MULTI-PLATFORM PRINTING SYSTEM WHEN ONE OF THE PLATFORMS IS IN A DEGRADED MODE

BACKGROUND OF THE INVENTION

The present invention relates generally to image reproduction systems, and more particularly relates to multi-functional, network adaptive printing systems for generating one or more jobs for storage within a selected queue.

Multi-functional printing systems are known and exist. One example of a multi-functional printing system are digital copiers that employ an electrostatic processing printer that is coupled to a plurality of different image input devices. The multiple image input devices are typically adapted to store a plurality of jobs for eventual printing. In one example, jobs are ordered for printing in an arrangement referred to as a print or system queue. Xerox network systems have employed the concept of the print queue to manage jobs at network printers. A print queue which can be employed in a conventional multi-functional printing system is disclosed in U.S. Pat. No. 4,947,345 of Paradise et al., the contents of which are incorporated herein by reference.

The multi-functional printing system typically includes a plurality of platforms, where each platform is adapted for performing a selected service. For example, a first platform can be provided to handle print services, and a second platform can be provided to handle copy services. During normal operation, the platforms communicate with a system manager, which controls and manages the jobs created and forwarded to the platforms for subsequent execution. Hence, the system manager provides instructions and suitable control structure for ensuring the proper and orderly handling of jobs.

A disadvantage of conventional multi-functional printing systems occurs when one or more platforms are disposed in a degraded mode. When in a degraded mode, the platform has either crashed or is otherwise disconnected, communication-wise, from the printing system. Once a platform crashes, the system is generally unable to determine the particular jobs present or stored in the crashed platform. Hence, the system user generally must wait for the crashed platform to be brought back on line, in order to determine which jobs are still currently pending in the platform.

SUMMARY OF THE INVENTION

The present invention provides for a multi-functional printing system having a plurality of platforms, where each of the platforms is adapted to perform a selected service or services. The printing system of the present invention includes a first platform having a first queue, such as a queue utility for storing a job associated with the first platform, and a second queue, such as a shadow queue, for storing a job associated with a different platform. The system can also employ a second platform disposed in communication with the first platform. The second platform has a first queue for storing a job associated with the second platform and a second queue for storing a job associated with a different platform.

According to one aspect, the first queues of the first and second platforms include a queue utility, and the second queues of the first and second platforms include a shadow queue. According to one practice, the second queue of the first platform is adapted to store a job associated with the second platform. The first and second platforms can also include one or more job queues for storing jobs.

According to another aspect, the system includes a user interface element coupled to a communication link. The communication link can be configured to communicate with the first and second platforms. The system can also include a system manager coupled to the communication link.

According to still another aspect, the system employs an ordering algorithm for merging together the contents of the first queues of first and second platforms to form a system queue, or the contents of the first and second queues of one or more of the first and second platforms when the other of platform is in a degraded mode to form the system queue. In degraded mode, the system queue reflects substantially all the jobs present in the printing system. The system can then display any selected subset of the jobs present in the system queue, the queue utility, or any selected job queue.

DESCRIPTION OF ILLUSTRATED EMBODIMENT

The present invention provides for a multi-functional image reproducing or printing system that employs multiple platforms for performing multiple different services. For example, the multi-function printing system can perform copy services, print services, facsimile services, and the like, by employing separate and discrete platforms for performing one or more service. The term "platform" is intended to include the use of specific hardware and/or software to perform one or more of the foregoing as well as other services typically associated printing, copying or document production systems. Each platform according to the present invention employs a queue utility that is configured for storing a specific job to be implemented by the printing system. Further, each platform includes a second or shadow queue that is intended to store jobs being performed by other different platforms. In this manner, if one of the platforms fails or is disconnected from the printing system (e.g., operating in a degraded mode), the printing system can reconstruct the total job listings by creating a system queue from one or more of the connected platforms, which contain information corresponding to the jobs that were supposed to be performed by the degraded platform in a shadow queue. In this manner, the printing system can synchronize the jobs to be performed by the platforms when and if the degraded platform is reset, reconnected, or in some other manner brought back on line.

The system of the present invention can be employed in a number of different types of image reproduction systems, examples of which include electrophotographic, electrostatic, ionographic, and other types of image forming or reproduction systems, which are adapted to capture, store and/or reproduce image data associated with a particular object, such as a document. The system of the present invention is intended to be implemented in a variety of environments, such as in any of the foregoing types of image reproduction systems, including conventional digital copier systems such as the DocuTech 135 series of copiers from Xerox, and is not limited to the specific image reproduction systems described herein.

Figure 1:
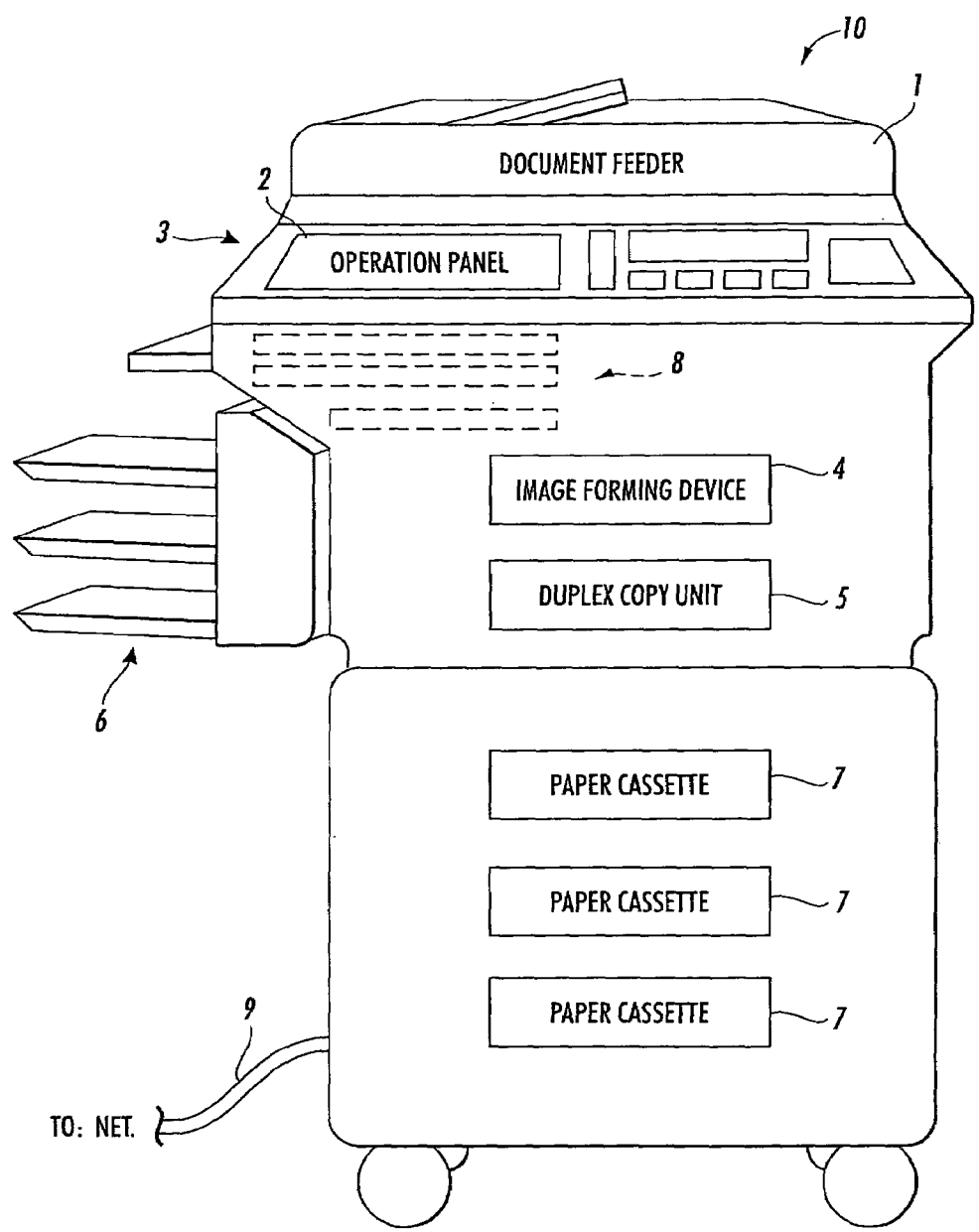
FIG. 1 is a perspective view of an image reproduction system, such as a multifunctional, network adaptive digital copier system, suitable for receiving and handling a job in accordance with the teachings of the present invention.

One broad example of a general image reproduction system suitable for employing the system of the invention is illustrated in FIG. 1. The illustrated image reproduction system can be configured as a digital copier system 10 having, in general, an image input stage (IIT) that is adapted to acquire, receive, or generate an image data, and a control stage (ESS) having associated control circuitry, software for managing image data, and storage for storing the image data. The control stage also includes an arrangement for controlling the transfer of image data to an image output stage (IOT). The image output stage can include any suitable apparatus for reproducing the image on a substrate, such as a conventional printer or copier, both of which are known and well characterized in the art. For purposes of simplicity, the image reproduction system will be referred to below as a digital copier system 10, and is not intended to be used in a limiting manner.

The digital copier system 10 illustrated in FIG. 1 more particularly includes a document feeder 1 and an operation and display panel 2. After desired conditions have been entered on the operation panel 2, the document feeder 1 conveys a document to a predetermined reading position on an image reading device 3 and, after the document has been read, drives it away from the reading position. The image reading device 3 illuminates the document brought to the reading position thereof. The resulting reflection from the document is transformed to a corresponding electric signal, or image signal, by a solid state imaging device, e.g., a CCD (Charge Coupled Device) image sensor. An image forming device 4 forms an image represented by the image signal on a plain paper or a thermosensitive paper supplied by the paper cassettes 7 with an electrophotographic, thermosensitive, heat transfer, ink jet or similar conventional system.

As a paper is fed from any one of paper cassettes 7 to the image forming device 4, the device 4 forms an image on one side of the paper. A duplex copy unit 5 is constructed to turn over the paper carrying the image on one side thereof and again feed it to the image forming device 4. As a result, an image is formed on the other side of the paper to complete a duplex copy. The duplex copy unit 5 has customarily been designed to refeed the paper immediately or to sequentially refeed a plurality of papers stacked one upon the other, from the bottom paper to the top paper. The papers, or duplex copies, driven out of the image forming device 4 are sequentially sorted by a output device 6.

The illustrated digital copier system 10 can be configured as a multi-functional system by incorporating one or more additional platforms 8, which can be configured to share the document feeder 1, operation panel 2, image reading device 3, image forming device 4, duplex unit 5, output device 6, and paper cassettes 7 which are the resources built in the digital copier system. The platforms 8 can be adapted to perform one or more services including a copy service, a print service (IOT), a facsimile service (fax), as well as other services. Additionally, the digital copier system can be coupled to a network by way of a conventional network connection 9.

Figure 2:
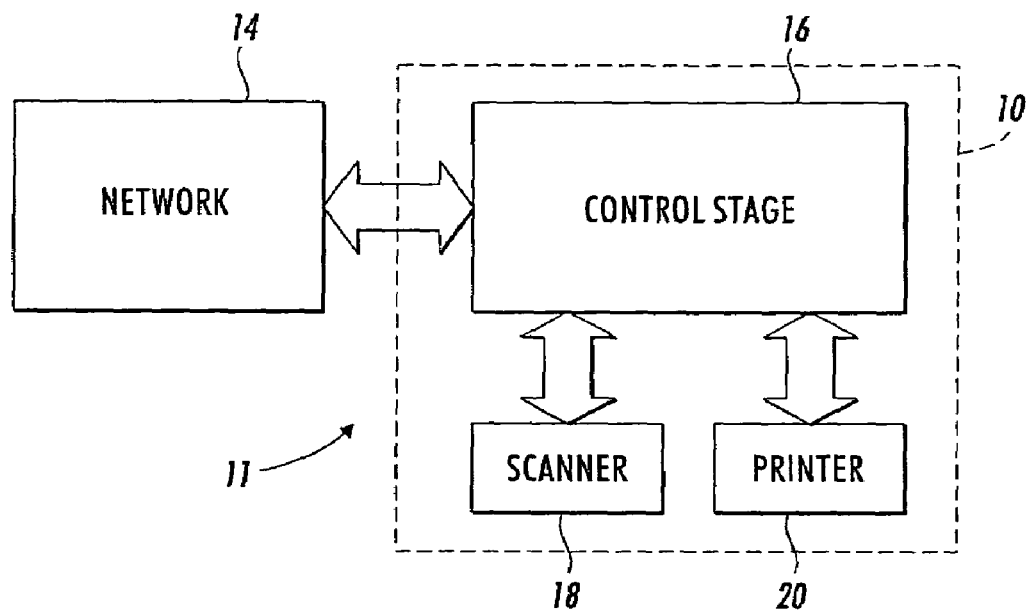
FIG. 2 is a general schematic block diagram of the multifunctional, network adaptive digital copier system of FIG. 1.

With reference to FIG. 2, a multifunctional, network adaptive printing system 11 is schematically illustrated and includes the digital copier system 10 operatively coupled with a network 14 via a communication link, such as a bus. The digital copier system 10 includes a control stage 16 in communication with a scanner or image input stage 18, and an image output stage or printer 20. The control stage 16, which will be described in further detail below, coordinates the operation of the scanner 18 and the printer 20 in a digital copying arrangement. In a digital copying arrangement, the scanner 18 reads an image on an original document by using a CCD full width array and converts analog video signals, as gathered, into digital signals. In turn, an image processing system 22 (FIG. 3), associated with the scanner 18, executes signal correction and the like, converts the corrected signals into multi-level signals (e.g. binary signals), compresses the multi-level signals and preferably stores the same in electronic precollation (EPC) memory 24.

The printer 20 can include a xerographic print engine. According to one practice, the print engine includes a multi-pitch belt (not shown) which is written on with an imaging source, such as a synchronous source (e.g. laser raster output scanning device) or an asynchronous source (e.g. LED print bar). In a printing context, the multi-level image data is read from the EPC memory 24 (FIG. 3) while the imaging source is turned on and off, in accordance with the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without departing from the spirit and scope of the invention. For example, the multi-functional, network adaptive printing system 11 can be implemented with a thermal ink jet or ionographic printer.

Figure 3:
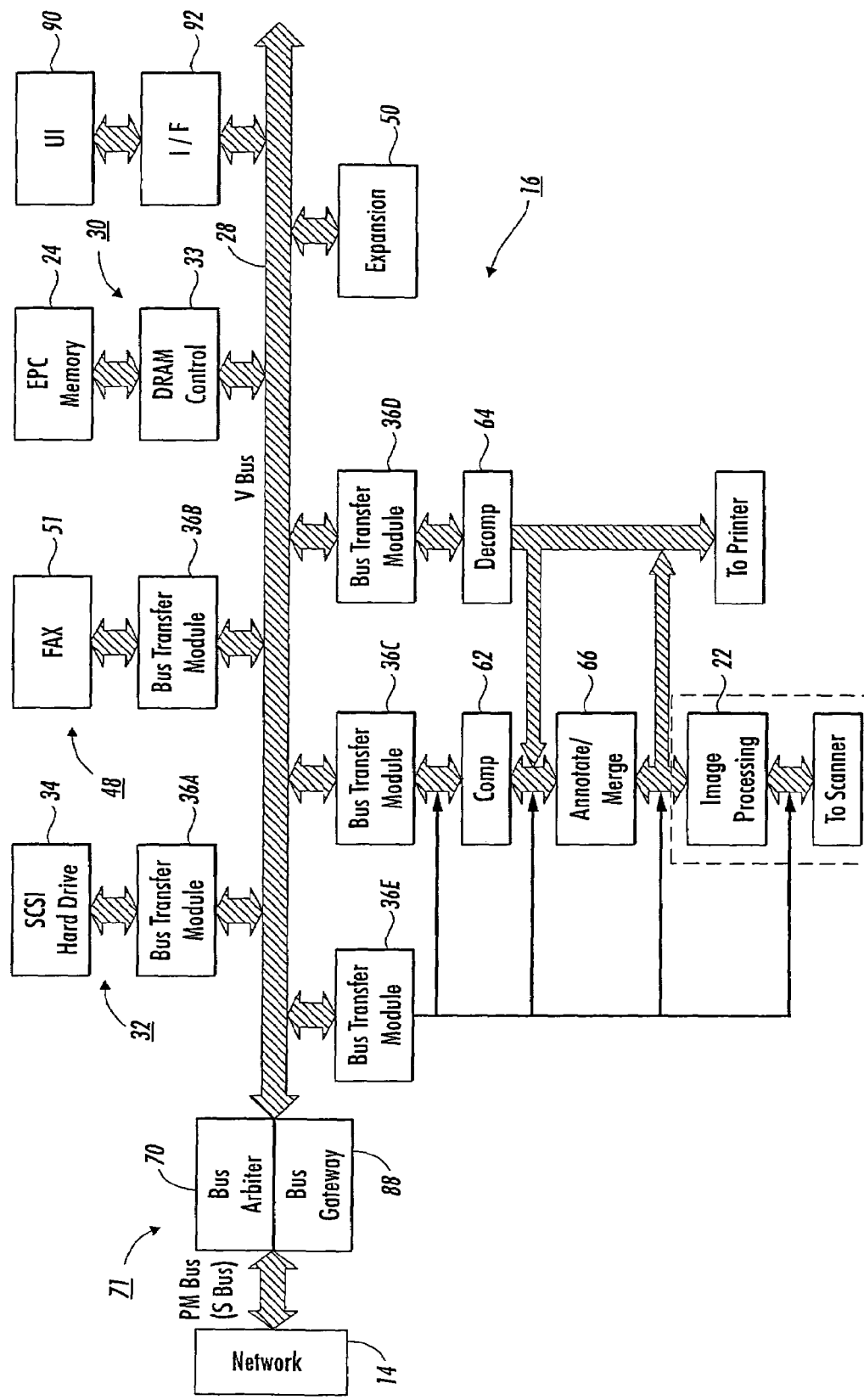
FIG. 3 is a schematic block diagram of the control stage of the multifunctional, network adaptive digital copier system of FIG. 2.

The general details of one embodiment of the control stage 16 of the digital copier system 10 of the invention can be illustrated schematically as a series of block diagrams, such as shown in FIG. 3. The illustrated control stage 16 includes a communication link, such as bus 28, with which various I/O, data transfer and storage components communicate. The illustrated bus 28 can be a high speed, 32 bit data burst transfer bus which is expandable to 64 bit.

The storage components of the control stage 16 reside in the EPC memory section 30 and the mass memory section 32. The EPC memory section 30 includes the EPC memory 24 coupled to the DRAM control 33, which is in turn coupled to the bus 28. The mass memory section 32 can include a SCSI hard drive device 34 coupled to the bus 28 by way of a bus transfer module 36A. Other I/O and processing components can be coupled to the bus 28 by way of additional bus transfer modules 36. It will be appreciated that other devices (e.g. a workstation or network) can be coupled to the bus by way of the transfer module through any suitable interface.

Referring to FIGS. 2 and 3, three I/O components are generally shown as being operatively coupled to the bus 28. These components include a fax module 51, the scanner 18, and the printer 20. Those of ordinary skill will readily appreciate that other I/O components can be coupled to the bus by way of a suitable connection, such as by the expansion slot 50.

The scanner 18 and printer 20 can be operatively coupled to the bus 28 by way of transfer modules 36C and 36D. Additionally, the scanner 18 and the printer 20 are operatively coupled with a compressor 62 and a decompressor 64, respectively. The compressor and decompressor are preferably provided by way of a single module that employs Xerox adaptive compression devices. Xerox adaptive compression devices have been used for compression/decompression operations by Xerox Corporation in its DocuTech® printing system. In practice, at least some of the functionality of the transfer modules is provided by way of a 3 channel DVMA device, which provides local arbitration for the compression/decompression modules 62 and 64.

The scanner 18, which includes the image processing section 22, is can be coupled to an annotate/merge module 66. The image processing section includes one or more dedicated processors programmed to perform various desired functions, such as image enhancement, thresholding/screening, rotation, resolution conversion, and TRC adjustment. The selective activation of each of these functions can be coordinated by a group of image processing control registers, the registers being programmed by a system controller or manager that communicates with the bus 28. The functions can be arranged along a "pipeline" in which image data is introduced to one end of the pipe, and image processed image data is outputted at the other end of the pipe. To facilitate throughput, bus transfer module 36E is positioned at one end of the image processing section 22 and the transfer module 36C is positioned at another end of the image processing section 22.

The data flow or 'traffic' present on the bus can be controlled by the system manager (FIG. 4) with the system processor or manager, and can further be controlled by arbitration of the various bus masters of the control stage 16. This arbitration process can be implemented by way of a bus arbiter 70 disposed in a bus arbiter/bus gateway module 71. The bus arbiter 70 determines which bus masters or platforms (e.g. fax module, scanner, printer, SCSI hard drive, EPC Memory, or network service module) can access the bus 28 at any given time. The bus arbiter 70 is composed up of two main sections and a third control section. The first section, also referred to as a "Hi-Pass" section, receives input bus requests and current priority selection, and outputs a grant corresponding to the highest priority request pending. The current priority selection input is the output from the second section of the bus arbiter 70 and is referred to as the "Priority Select" section. This section implements a priority rotation and selection algorithm stored in system memory. At any given moment, the output of the logic for the priority select section determines the order in which pending requests are serviced by the control stage 16. The input to the Priority Select section is a register which holds an initial placement of devices on a priority chain. When servicing requests, the logic of the Priority Select section moves the devices up and down the priority chain thereby selecting the position of a device's next request. Control logic synchronizes the tasks of the Hi-Pass and the Priority Select sections by monitoring signals regarding request/grant activity.

Referring to FIG. 2, the network module 14 has an architecture that can be similar to that of a known "PC clone" or client machine. More particularly, the network module 14 can include a controller coupled with a standard bus. The network module 14 can also include memory and if desired, a storage or I/O device can be coupled with the bus via a suitable interface chip. The network module 14 can be coupled to another network by way of an appropriate network interface. In this configuration, the control stage 14 can operate as a print server, or if desired, the network module coupled to the control stage can function as the print server.

The network module can also configured as a traditional network that includes one or more host or client devices coupled to one or more servers. The network can be configured as either a LAN or a WAN.

According to one practice, a user or other designated or specific operator can generate a job, such as a print job, copy job, or fax job, having a plurality of electronic pages (document content) and a set of processing instructions (job ticket). For example, a print job can be formed by the association of document content, encoded in the form of a page description language (PDL) file, with a job ticket that carries information relating to non-content related parameters for processing the print job. These parameters, which include finishing instructions such as whether or not the printed document is to be stapled, or what type of paper the printed document is to be printed on, are encoded in one or more base data fields on the base job ticket. The job can then be transmitted to the system controller where it is interpreted with a decomposer, such as one provided by Adobe Corporation. Some of the principles underlying the concept of interpreting a PDL job are provided in U.S. Pat. No. 5,493,634 to Bonk et al. and U.S. Pat. No. 5,226,112 to Mensing et al., the contents of which are incorporated herein by reference.

With reference again to FIG. 3, the network 14 is coupled with the control stage 16 via a bus gateway 88, which can form part of the bus arbiter/bus gateway 71. In one example, the bus gateway comprises a field programmable gate array provided by XILINX corporation. The bus gateway 88 forms the interface between the communication link (bus) formed between the network 14 and the bus 28. The bus gateway 88 also provides the bus address translation for accesses to address spaces in the real address range of the bus 28, and passes a virtual address to the network bus for virtual addresses in the host address range. A DMA channel for memory to memory transfers is also implemented in the bus gateway 88. Among other things, the bus gateway 88 provides seamless access between the bus 28 and the network bus, and decodes virtual addresses from bus masters, such as one of the transfer modules 36, so that an identifier can be obtained from a corresponding slave component. It will be appreciated by those skilled in the art that many components of the printing system 10 are implemented in the form of a single ASIC.

The control stage further employs a user interface (UI) element 90 that connects to the bus 28 through an interface module 92. The UI element 90 allows a user or a designated individual to interface and interact with the digital copier system. The user can request that certain information be displayed or presented to the user, or can initiate one or more of a number of actions, including initiating a service or creating a job.

Figure 4:
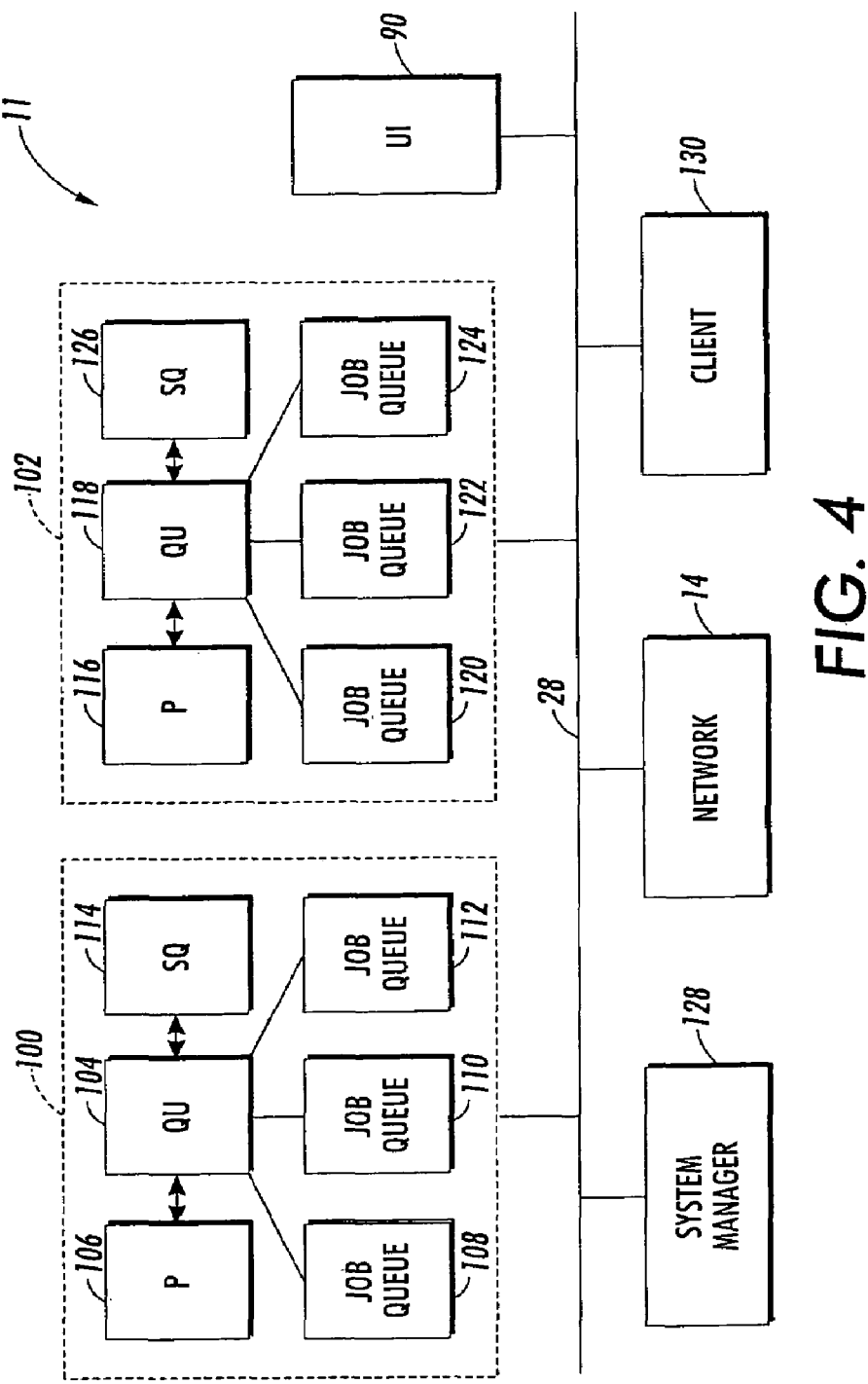
FIG. 4 is a schematic block diagram of the multiple platforms employed by the multifunctional, network adaptive digital copier system of FIG. 2 in accordance with the teachings of the present invention.

The multi-functional, network adaptive printing system 11 described above can also be generally, schematically illustrated as a printing system that employs a plurality of discrete and separate platforms for performing selected services. The platforms of the present invention can perform print services, copy services, fax services, as well as any other appropriate service consistent with the hardware and software architecture of the particular platform. With reference to FIG. 4, the printing system 11 is schematically illustrated as including multiple platforms, including a print and fax platform 100, and a copy and scan platform 102. Although the image reproduction system 10 only illustrates two platforms, those of ordinary skill will readily recognize that multiple additional platforms can be employed in connection with the present invention. Furthermore, although the platforms 100 and 102 will be described as providing certain selected services, those of ordinary skill will also recognize that different services can be provided by the illustrated platforms, or the same services can be provided by multiple platforms without departing from the spirit and scope of the present invention.

The print and scan platform 100 is adapted for performing a number of selected services, including print and fax services, as well as providing network communication and other associated functionality for the printing system. The illustrated print and fax platform 100 employs a number of components, which are generally and illustratively illustrated in FIG. 4 for purposes of simplicity. The platform 100 includes a queue utility 104 that communicates with a resident processor 106. The queue utility can communicate with one or more job queues, such as queues 108, 110 and 112. Although illustrated with three job queues, those of ordinary skill will readily recognize that any number of job queues can be provided in each particular platform. The job queues can be configured to store jobs of a particular type (e.g., print jobs), or can be used as a general job repository. The queue utility 104 further communicates with a storage element which can be configured as a shadow queue 114. The platform 100 communicates with the bus 28 via any appropriate bus transfer modules or interface circuitry, as illustrated in FIG. 3.

Likewise, the copy and scan platform 102 includes a processor 116 that communicates with a queue utility 118. The queue utility 118 in turn communicates with job queues 120, 122 and 124. The illustrated copy and scan platform 102 can employ any number of job queues which are disposed in communication with the queue utility 118. The queue utility 118 is further disposed in communication with a shadow queue 126.

The illustrated printing system 11 further includes a system manager 128 that manages or controls the operation of the system, and owns all system settings, including any particular ordering algorithms used to merge together the contents of one or more queues, as described in more detail below. The illustrated system manager 128 further functions as the controller for the system, and hence operates as the primary request and signal generator for the system 10. The system manager 128 is generically illustrated to represent the functionality of the image reproduction system separate and distinct from the operational features of the platforms 100 and 102. Those of ordinary skill will readily recognize the functions to be performed by the system manager as well as in connection with the teachings herein.

The bus 28 can further be connected to the network 14 according to any known network arrangement, and can also be connected to a client machine 130. According to one practice, the client 130 can be a stand-alone IBM compatible personal computer that directly interfaces with the printing system 11 via bus 28. The client 130 can operate as a second or redundant user interface between a user (originator) and the system in order to display selected system features or system status, or initiating selected system functions, such as printing jobs of various types or initiating the merging of certain utilities. Likewise, the network 14 can operate as another user interface.

When a job is submitted to the printing system 11 for execution by a particular platform, the job is stored in a corresponding job queue. For example, the job queue 108 of platform 100 can be configured for storing print jobs, the job queue 110 can be configured for storing fax to print jobs, and the job queue 112 can be configured to store fax forward jobs. Each job stored in a particular job queue thus represents an action to be performed by the platform 100 and correspondingly the printing system 11. According to one practice, the queue utility 104 can request a listing of the particular jobs stored in one or more of the job queues 108, 110 and 112. The queue utility is configured for merging together the contents of the job queues according to the ordering algorithm of the system manager 128. The contents of the job queues 108–112 can be merged by the queue utility 104 according to the ordering or sorting methodology set forth in U.S. Pat. No. 5,923,826, the contents of which are herein incorporated by reference. In general, the queue utility 104 can merge together the contents of the job queues 108–112 according to a conventional ordering operation with the ordering being based on one of a number of suitable criteria. For example, the ordering can be based on the time at which a given job is introduced to the printing system 11, according to job type, as well as the time that the job was created and submitted to the system. For instance, a copy job received by the image reproduction system at one time can be given priority over a copy job received by the system at a later time.

According to the present invention, the ordering algorithm employed by the system manager 128 can also order jobs created within the multi-functional printing system as follows, in descending order of importance: "now" priority jobs are introduced in a first-in-first-out (FIFO) order, "interrupted" jobs, "next" priority jobs, and so forth. The jobs can be ordered based on the ordering scheme of the system queue, which can employ a FIFO or priority based ordering scheme. The resultant list created by the queue utility 104 according to the ordering algorithm is the total job queue for the particular platform.

Likewise, the copy and scan platform 102 can be configured to provide a list of the total number of jobs to be performed by that particular platform. For example, the queue utility 118 can request the contents of the job queues 120, 122 and 124. As discussed above, each job queue 120–124 can be configured to store jobs of a particular type. According to one example, the job queue 120 can be configured to store copy jobs, the job queue 122 can be configured to store report jobs, and the job queue 124 can be configured to store test pattern jobs. The system user can request the queue utility to merge together the contents of the job queues 120, 122 and 124. Job queue 118 merges together the contents of the job queues 120–124 according to the above-described ordering algorithm.

The platforms 100 and 102 further include a shadow queue 114 and 126, respectively, for storing jobs that originated from other platforms. For example, the print and fax platform 100 employs a queue utility 104 that stores in the shadow queue 114 all jobs that originate from platform 102. In this manner, the platform 100 contains a listing of all jobs that originate therefrom, as well as a listing of all jobs that originate from other platforms. Conversely, the copy and scan platform 102 employs a queue utility 118 that stores in the shadow queue 126 all jobs that originate from platform 100.

Figure 5:
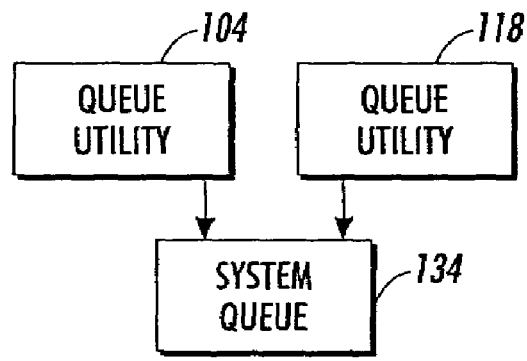
FIG. 5 is a schematic block diagram illustrating the merging of the queue utilities of the multiple platforms in accordance with the teachings of the present invention.

During operation of the illustrated printing system 11, a system user or originator can request through the user interface 90, client machine 130, or network 14 that the system's entire list of jobs be displayed. If this occurs, one of the queue utilities, such as queue utility 104, can request the contents of the other queue utility, such as queue utility 118, and the combined queue contents are merged together according to the ordering algorithm. The combined contents of queue utilities 104 and 118 thus form a system queue 134 that lists all jobs in the system 11. This merging process is illustrated in FIG. 5. If a platform "crashes" or otherwise is unable to communicate with the rest of the system via bus 28, the printing system 11 is in a degraded mode. In this mode, a system user can request via a system setting that the system queue 134 be displayed. At this point, the system user desires the system queue 134 to include the last known set of jobs from the crashed platform, in order to determine which jobs originated from the crashed platform. The system user can request the system queue 134 to be displayed either at the user interface 90, the network 14 or client 130.

Figure 6:
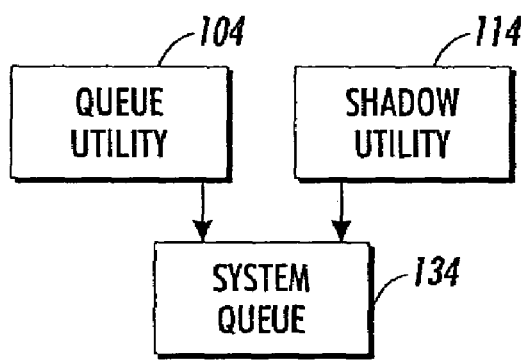
FIG. 6 is a schematic block diagram illustrating the merging of a queue utility and a shadow utility of a selected platform of the multiple platform system of FIG. 4 in accordance with the teachings of the present invention.

For example, the queue utility 104 responds to a queue request generated by the user through any appropriate user interface element. The queue utility 104 responds to this queue request by merging the contents of the job queues 108, 110 and 112, into the queue utility 104, if not previously done. The contents of the queue utility 104 are then merged with the contents of the shadow queue 114, which contain the complete list of all jobs that originate from the other platform, according to the ordering algorithm employed by the system manager 128. In this manner, the platform 100 can generate a system queue 134 by merging the contents of the queue utility 104 and the shadow utility 114 in response to a user request. This is illustrated in FIG. 6. Those of ordinary skill will readily recognize that all or a subset of the jobs in the system queue can be displayed. For example, the system 11 can display just the jobs the originate from the platform, or just the jobs stored in the shadow queue.

Each platform maintained a listing of jobs generated by the platform in a particular job queue, as well as maintains a list of jobs originating from other platforms in the shadow queue 114. Whenever a job is created or added to the system, the appropriate shadow queue is updated to reflect the addition of this job. Hence, when a job is, for example, added to the system, the appropriate queue raises a system event specifying the action (add or delete), internal job identifier, the job queue destination for the particular job, the platform corresponding to the job, and the queue displayed data (e.g., job name, job owner, quantity, and priority). If the job added to the system resides on another platform, the queue utility 104 of platform 100 creates a copy of the job information and stores it in the shadow queue 114. Conversely, for a non-resident job that is deleted from the system, the queue utility 104 removes the corresponding job data from the shadow queue 114. As long as the platforms are fully operational and not in a degraded mode, the shadow queues may not be used by the system, since the queue utilities of each platform contain a complete listing of all jobs being performed by the system.

As illustrated in FIG. 6, in a degraded mode, the queue utility of one or more non-crashed platforms is merged with the resident shadow utility to form a system queue 134. The complete list of jobs represented by the system queue can be displayed to the user through a corresponding user interface element. The jobs present in the shadow queue are held waiting for the appropriate platform resources to be released, or for a further action to be performed as initiated by the system user.

When the crashed platform re-establishes communication in the shadow queue of the non-crashed platform with the contents of the queues and/or queue utilities resident in the crashed platform with the bus 28, the queue utilities of the platforms 100 and 102 synchronize the set of existing or pending jobs in order to verify the accuracy of the jobs in the system. Once the job listings are synchronized by the system, the system queue 134 will automatically be updated and re-displayed to the system user.

A significant advantage of the present invention is that it provides for an image reproduction system that employs a distributed model for storing, merging and displaying jobs corresponding to multiple services performed by multiple platforms. The methodology of employing a shadow queue to store print jobs originating from other platforms provides for a decentralized job listing approach that enables the system to handle the crash of a particular platform in an easy and relatively reliable manner. The system further provides for the ability for the system user to display a listing of the jobs associated with the crashed platform, as well as the jobs for the entire system.

Figure 7:
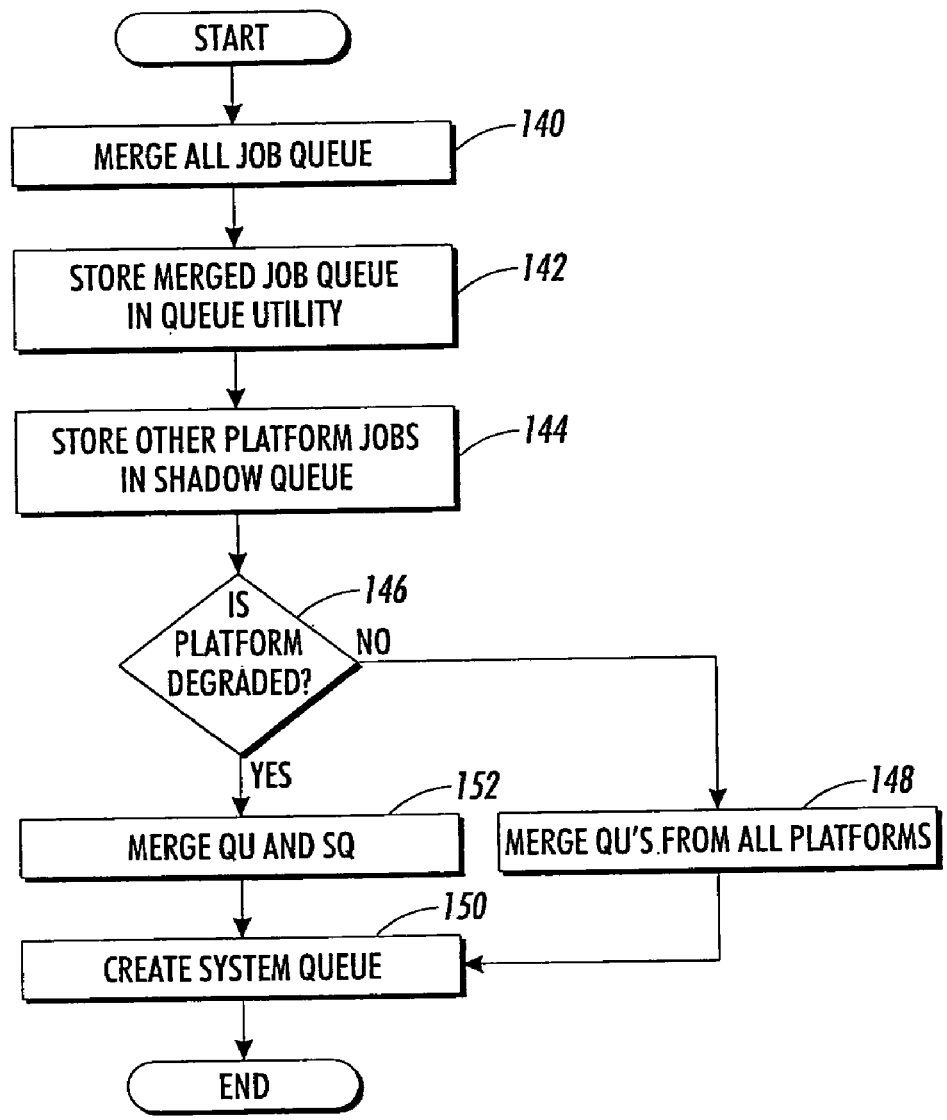
FIG. 7 is a schematic flow chart diagram illustrating the method of merging selected utilities of one or more platforms of the multiple platform system of FIG. 4 in accordance with the teachings of the present invention.

Another advantage of the invention is that display of the system queue can be initiated by any local or remote user interface without suffering performance degradation. FIG. 7 is a schematic flow chart diagram illustrating the operation of the printing system 11 according to the features of the present invention. A system user can create particular jobs to be performed by a platform in a multi-functional, network adaptive printing system. The jobs associated with a particular platform are stored in one or more job queues. Upon a specific request, a queue utility resident within the platform can access the contents of a single job queue, or merge together according to an ordering algorithm the jobs stored in all or a subset of the job queues (step 140). The merged job queues are then stored in the queue utility (step 142). Likewise, upon request, the queue utilities for the other platforms can also merge together the contents of their corresponding job queues according to the ordering algorithm (step 144). If the system receives a request to create a system queue, the printing system 11 can merge together the contents of all queue utilities to form a system queue. This generally occurs when the system is functioning in full operational mode, where the contents of the shadow queues are not required (steps 148 and 150).

If one or more of the platforms are determined to be in a degraded mode, a system user can request that the non-degraded or non-crashed platform merge together the contents of the resident queue utility, which represents all presently pending jobs for that particular non-crashed platform, with the job listings stored in the shadow queue (step 152) to create the system queue 134 (step 150). In this manner, the printing system 11 can display for the user a listing of all the jobs for the system, including the jobs identified or associated with the crashed platform.

Having described the invention, what is claimed as new and desired to be secured by Letters Patent is:

1. A multi-functional printing system having a plurality of platforms, each of said platforms being adapted to perform a service, said printing system comprising:
   a first platform having a first queue for storing a job associated with said first platform and a second queue for storing a job associated with another one of said plurality of platforms, other than said first platform; a second platform in communication with said first platform having a first queue for storing a job associated with said second platform and a second queue for storing a job associated with another one of said plurality of platforms, other than said second platform; and a merging algorithm configured to merge contents of a plurality of job queues associated with said first and second platforms into said first queue according to an ordering algorithm, wherein said first queue contains a prioritized list of all jobs in that platform.

2. The printing system of claim 1, wherein said first queue of said first and second platforms comprises a queue utility.

3. The printing system of claim 1, wherein said second queue of said first and second platforms comprises a shadow queue.

4. The printing system of claim 1, wherein said second queue of said first platform is adapted to store a job associated with said second platform.

5. The printing system of claim 1, further comprising a communication link coupled to said first and second platforms for forming a connection between said first and second platforms.

6. The printing system of claim 5, further comprising a user interface element coupled to said communication link.

7. The printing system of claim 5, further comprising a system manager coupled to said communication link, said system manager including a storage element for storing an ordering algorithm.

8. The printing system of claim 1, wherein said second queue contains a data subset comprising an updated listing of all jobs located in the other of said first and second platforms according to an ordering algorithm, when the other of said platforms is in a degraded mode, thereby forming an ordered system queue reflecting substantially the totality of jobs present in the printing system.

9. A multifunctional printing system having a plurality of platforms, each of said platforms being adapted to perform a service, said printing system comprising:

a first platform having a first queue for storing a job associated with said first platform and a second queue for storing a job associated with another one of said plurality of platforms, other than said first platform; a second platform in communication with said first platform having a first queue for storing a job associated with said second platform and a second queue for storing a job associated with another one of said plurality of platforms, other than said second platform; and a merging algorithm configured to merge contents of said first queues of said first and second platforms to form an ordered system queue during a normal operating mode according to an ordering algorithm.

10. In a multi-functional printing system having a plurality of platforms, each of said platforms being adapted to perform a service, a method comprising the steps of storing a job in a first queue associated with a first platform and storing a job associated with another one of said plurality of platforms, other than said first platform, in a second queue associated with said first platform, storing a job in a first queue associated with a second platform and a job associated with another one of said plurality of platforms, other than said second platform, in a second queue associated with said second platform, and merging together the contents of a plurality of job queues according to a merging algorithm provided in one of said first and second platforms into said first queue, according to an ordering algorithm.

11. The method of claim 10, wherein said first queue of said first and second platforms comprises a queue utility.

12. The method of claim 10, wherein said second queue of said first and second platforms comprises a shadow queue.

13. The method of claim 10, wherein said second queue of said first platform is adapted to store a job associated with said second platform.

14. The method of claim 10, further comprising the step of disposing said first platform in communication with said second platform for forming a connection therebetween.

15. The method of claim 10, further comprising the steps of providing a communication link for placing said first platform in communication with said second platform, and coupling a user interface element to said communication link.

16. The method of claim 15, further comprising the step of coupling a system manager to said communication link.

17. The method of claim 10, wherein said contents of said first and second queues of one of said first and second platforms when the other of said platforms is in a degraded mode, thereby forming a system queue reflecting substantially the totality of jobs present in the printing system.

18. In a multi-functional printing system having a plurality of platforms, each of said platforms being adapted to perform a service, a method comprising the steps of storing a job in a first queue associated with a first platform and storing a job associated with another one of said plurality of platforms, other than said first platform, in a second queue associated with said first platform, storing a job in a first queue associated with a second platform and a job associated with another one of said plurality of platforms, other than said second platform, in a second queue associated with said second platform, and merging together the contents of said first queues of said first and second platforms according to an ordering algorithm to form a system queue.

19. A multi-functional printing system which can display an integrated job queue listing in a normal or degraded mode comprising a first queue, which responds to a queue request by obtaining jobs from working platforms, including at least a first working platform, a second queue, which maintains a back up copy of any jobs to be completed on other platforms, including a second working platform within a local data store, and an ordering algorithm, which merges job information stored on each platform and orders the jobs within the printing system in descending order of importance, currently processing "now" priority jobs in a first-in-first-out (FIFO) order, wherein interrupt jobs are "now" priority, "interrupted" jobs, "next" priority jobs in FIFO order, wherein promoted jobs are "next" priority, and all other remaining jobs.

20. The printing system of claim 19, wherein said integrated queue listing is achieved by using partial job information, which is the data from the shadow queue, that is replicated on all platforms during normal operation, while in degraded mode, which allows for presentation of the integrated job queue listing from an unresponsive system.

21. The printing system of claim 19, further comprising a communication link coupled to said first and second platforms for forming a connection between said first and second platforms.

22. The printing system of claim 19, further comprising means for merging together the contents of said first queues of said first and second platforms to form an ordered system queue during a normal operating mode, according to an ordering algorithm.

23. The printing system of claim 19, further comprising means for merging together the contents of said first and second queues of one of said first and second platforms, which contains a data subset comprising an updated listing of all jobs located in the other of said first and second platforms according to an ordering algorithm, when the other of said platforms is in a degraded mode, thereby forming a system queue reflecting substantially the totality of jobs present in the printing system.

24. The printing system of claim 19, wherein one of the first and second platforms includes a plurality of job queues, said printing system further comprising means for merging together the contents of said job queues into said first queue according to an ordering algorithm, wherein said first queue contains a prioritized list of all jobs in that platform.

* * * * *